G. A. BRIGGS.
SHAFT CONNECTOR.
APPLICATION FILED JAN. 22, 1912.

1,057,928.

Patented Apr. 1, 1913.

UNITED STATES PATENT OFFICE.

GEORGE A. BRIGGS, OF ELKHART, INDIANA.

SHAFT-CONNECTOR.

1,057,928.  Specification of Letters Patent.  Patented Apr. 1, 1913.

Application filed January 22, 1912. Serial No. 672,565.

*To all whom it may concern:*

Be it known that I, GEORGE A. BRIGGS, a citizen of the United States, residing at Elkhart, in county of Elkhart and State of Indiana, have invented certain new and useful Improvements in Shaft-Connectors, of which the following is a specification.

My invention relates to an improvement in shaft connectors, and more particularly for connecting the driven shaft of a magneto with the drive shaft of a combustion engine.

The object is to provide for a close timing of the magneto with respect to the travel of the motor, and also to provide for making the connection between the two shafts when they are out of alinement with each other.

The invention consists in certain novel features of construction and combinations of parts which will be hereinafter fully described and pointed out in the claims.

Figure 1:
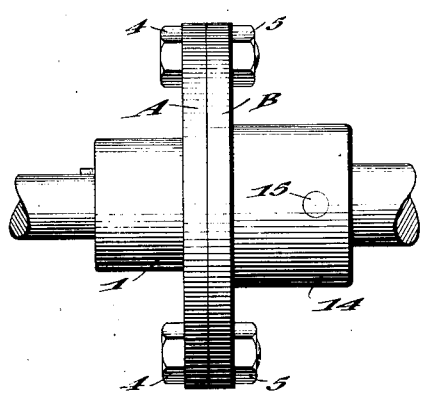
Figure 2:
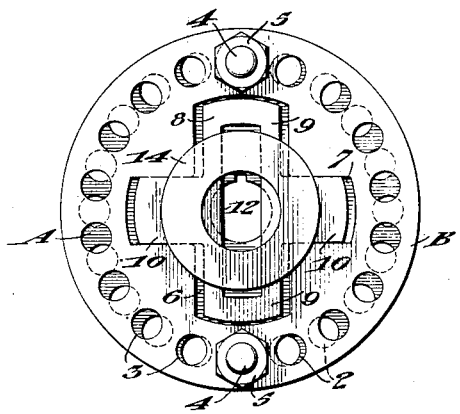
Figure 3:
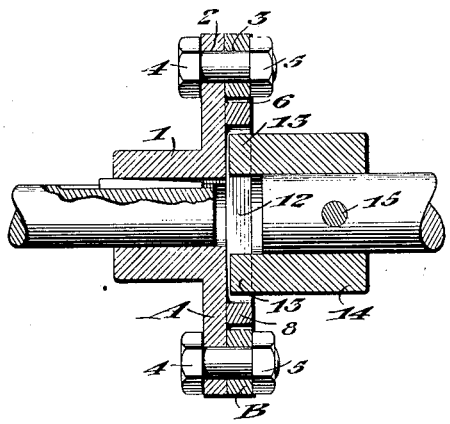
Figure 4:
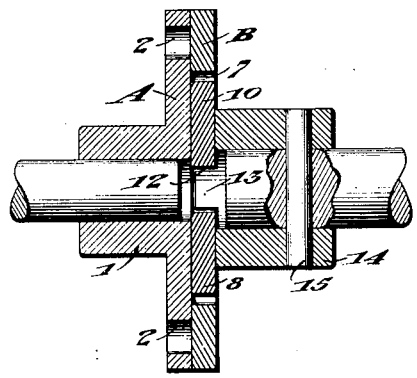

In the accompanying drawings, Figure 1 is a view in side elevation; Fig. 2 is an end view; Fig. 3 is a longitudinal vertical sectional view; and Fig. 4 is a horizontal sectional view.

A, represents one of the disk members which is provided with a hub 1 for connection to an engine shaft, and which is preferably splined to the shaft. The disk A is provided with a plurality of openings 2 along the periphery thereof. The disk member B is provided with a plurality of openings or holes 3 which are of less number than the number of openings 2 in the disk A. These disks are adapted to be connected together by means of bolts 4 and nuts 5, by passing the bolts through registering openings 2 and 3. The disk B is provided with slots 6 and 7, the slots presenting a Maltese cross, the slots 6, however, being of a greater diameter than the slots 7. A movable member 8 having projections or arms 9 and 10 is received in the slotted opening formed in the disk B, the arms or projections 10 being of a size to fit the diameter of the slots 7, but being of a length unequal to the length of the slots; and the arms or projections 9 being of a length almost equal to the length of the slots 6, but of a width unequal to the width of the slots 6. The movable member 8 is provided with an elongated slot 12, in which lugs 13, 13, formed on the collar 14, are received. These lugs are capable of a movement longitudinal of the slot. The collar 14 is adapted to be connected to the magneto shaft by a screw or other means, passing through the opening 15 therein.

By removing the bolts 4, the disk B can be rotated about one-thirty-second of an inch to the right, or clockwise, causing two of the openings in the disk member A and two of the openings in the disk member B to be brought into exact alinement to receive the said bolts. In this manner a slight adjustment of about one-thirty-second of an inch anywhere in the complete circle can be obtained, and by this arrangement it provides for the magneto to be completely installed with the motor and the magneto properly timed with the motor.

The projections 9 and 10 are capable of movement in the slots 6 and 7, but the movement of the projections 10 in slots 7 is in a different direction from the direction taken by the projections 9 with respect to the slots—that is, the projections 10 will move longitudinally of the slots 7, while the projections 9 will move cross-wise of the slots 6, and the lugs 13 of the collar 14 will move longitudinally of the slot 12. This connection produces a free universal lateral motion. From such a connection it will be seen that the magneto shaft could be a reasonable amount out of alinement with the drive shaft and yet perfectly free operation of both shafts could be obtained.

Having fully described my invention, what I claim as new and desire to secure by Letters Patent, is:—

1. A shaft connector comprising two disks having openings therein, one of the disks having a greater number of openings than the other, means connected to one of the disks for connecting the disk to a shaft, the other disk having slots therein extending crosswise of each other, a movable member fitted in the slots of the disk and having during its movement a longitudinal movement in one of the slots, and a lateral movement in the other slot, said movable member having an elongated slot, means received in said elongated slot for connecting the movable member to a shaft, said means capable of having a longitudinal movement in said slot, and means passing through the openings of the disks for connecting the disks together to adjust the position of the shafts connected to the disks.

2. A shaft connector comprising two disks, means for connecting one of the disks to a shaft, the other disk having slots therein extending cross-wise of each other, a movable member fitted in the slots of the disk having when actuated a longitudinal movement in one of the slots and a lateral movement in the other slot, said movable member having an elongated slot, and means received in said elongated slot for connecting the movable member to a shaft, said means capable of a longitudinal movement in said slot.

3. A shaft connector comprising two disks, means for adjustably connecting the disks together, means for connecting one of the disks to a shaft, the other disk provided with cross wire slots, a movable member received in the slots of the disk and having arms, one set of arms being of less length than the slots in which they are received, and the other arms being of less width than the slots in which they are received, whereby the movable member when actuated will move longitudinally in one of the slots and laterally in the other, said movable member having an elongated slot therein, and means received in said elongated slot for connecting the movable member to a shaft, said last mentioned means capable of a longitudinal movement in said elongated slot.

In testimony whereof I affix my signature, in the presence of two witnesses.

GEORGE A. BRIGGS.

Witnesses:
PERRY L. TURNER,
GRACE BAUM.